(12) United States Patent
Moussouni

(10) Patent No.: US 7,018,432 B2
(45) Date of Patent: Mar. 28, 2006

(54) CANDLE COMPOSITION AND CANDLES MADE THEREFROM

(75) Inventor: Farid Moussouni, Hull (GB)

(73) Assignee: Reckitt Benckiser (UK) Limited, Slough (GB)

( * ) Notice: Subject to any disclaimer, the term of this patent is extended or adjusted under 35 U.S.C. 154(b) by 0 days.

(21) Appl. No.: 10/518,969

(22) PCT Filed: Jun. 30, 2003

(86) PCT No.: PCT/GB03/02796

§ 371 (c)(1),
(2), (4) Date: Jun. 1, 2005

(87) PCT Pub. No.: WO2004/003082

PCT Pub. Date: Jan. 8, 2004

(65) Prior Publication Data

US 2005/0229815 A1    Oct. 20, 2005

(30) Foreign Application Priority Data

Jun. 28, 2003  (GB) .................................. 0215046

(51) Int. Cl.
*C11C 5/00* (2006.01)
*C10L 5/00* (2006.01)
*C08L 91/08* (2006.01)

(52) U.S. Cl. .................. 44/275; 106/270; 106/272; 431/288

(58) Field of Classification Search .............. 106/270, 106/272; 44/275; 431/288
See application file for complete search history.

(56) References Cited

U.S. PATENT DOCUMENTS

| 3,046,101 A | * | 7/1962 | Tench ........................... 44/275 |
| 3,198,193 A | | 8/1965 | Schwartzman .............. 128/198 |
| 3,216,921 A | * | 11/1965 | Fox .............................. 208/21 |
| 4,002,706 A | * | 1/1977 | Pretorius ..................... 264/13 |
| 4,118,203 A | * | 10/1978 | Beardmore et al. ........... 44/275 |
| 4,855,098 A | * | 8/1989 | Taylor ........................ 264/103 |
| 6,224,641 B1 | * | 5/2001 | Matzat et al. ................. 44/275 |
| 6,440,184 B1 | * | 8/2002 | Noda et al. .................... 44/275 |

FOREIGN PATENT DOCUMENTS

| DE | 116 468 A | 11/1975 |
| EP | 0860 472 A | 8/1998 |
| EP | 0 930 355 A | 7/1999 |
| FR | 1245806 A | 10/1960 |
| GB | 0691548 | 5/1953 |
| JP | 2000325458 A | 11/2000 |
| WO | WO 01 74971 A | 10/2001 |

OTHER PUBLICATIONS

Database WPI; Section Ch, Week 199838; Derwent Publications Ltd., London, GB; AN 1998-440141; XP002255921 & HU 213 382 A (Mol Magyar Olaj ES Gazipari RT), Mar. 30, 1998; abstract.

* cited by examiner

*Primary Examiner*—David Brunsman
(74) *Attorney, Agent, or Firm*—Norris McLaughlin & Marcus PA

(57) ABSTRACT

A paraffin wax candle composition comprising a mixture of a hard paraffin wax and a soft paraffin wax the hard wax having a penetration value as measured by the Needle Penetration Test as defined in ASTM D 1321 of no more than 25 and the soft wax having a penetration value of no less than 45, the composition itself having a penetration value between 30 and 50.

12 Claims, No Drawings

CANDLE COMPOSITION AND CANDLES MADE THEREFROM

This application is a 371 filling of PCT/GB03/02796, filed 30 Jun. 2003.

This invention relates to candle compositions, in particular candle compositions made from paraffin wax, and to candles made therefrom.

As is well known, in addition to their use as a means for providing light, candles are popular for their aesthetic appeal, both in terms of the type of light which they produce and also their appearance as articles, as well as being a means of delivering a fragrance or other air-borne agent to an environment.

The manufacture of good quality candles is determined by several criteria which need to be met by the composition formulation from which the candle is made.

Among these criteria are the following:

Low shrinkage: Where a candle wax is to be used to fill a glass container the shrinkage of the composition should of course be as low as possible in order to avoid the presence of voids between the solidified wax and the glass vessel.

Transparency of the pool when the candle is burning: Ideally the pool of molten wax at the base of the flame should be transparent.

Size of the pool: This should not be too small as this usually indicates poor burning illustrated in extreme cases by a phenomenon of "tunelling".

Residue left after burning candle and particularly at the end of life: In general the smaller the amount of residue left after burning the better.

The post burning aesthetics of a candle should also be good; that is, the residual wax should not have a burnt appearance.

Other important criteria include the melting point of the wax. This is ideally around 50° C., for example, from about 45° C. to about 55° C. If the melting point is lower than this then a problem of stability can arise in warmer countries but if the melting point of the wax is higher than this, in the case where the candle contains a fragrance or other air-borne agent it is not so easily released because the higher melting waxes hold on to the fragrance too effectively. An additional consideration is that higher melting point waxes tend not to burn so well and tend to leave more residue on the glass container. Also generally, Low Melting Point waxes shrink less than higher Melting Point waxes.

The present invention relates to the concept of producing a paraffin wax composition which produces an optimum combination of all or most of the criteria mentioned above. In particular, it has been discovered that a wax composition which comprises a mixture of a relatively hard paraffin wax with a relatively soft paraffin wax enables the composition to more closely fulfil or approach an optimum combination of the criteria which are explained above.

Specifically, the present invention provides a paraffin wax candle composition comprising a mixture of a hard paraffin wax and a soft paraffin wax the hard wax having a penetration value as measured by the Needle Penetration Test as defined in ASTM D 1321 of 16–20 and the soft wax having a penetration value of no less than 45, the composition itself having a penetration value between 30 and 50. In a preferred embodiment a candle wax composition which is particularly suitable comprises a paraffin wax which gives a penetration test result of 16–20 in the ASTM D 1321 penetration test and/or a paraffin wax which shows a penetration of 50–70 in the same test gives a candle wax composition which is particularly suitable.

In a preferred embodiment the melting point of the composition is in the range from 45° C. to 55° C., most preferably 50° C.

Preferably the proportion of the hard wax to the soft wax is in the range from 50:50 to 10:90, and can, for example, be about 30:70.

The actual percentage by weight of the hard wax plus soft wax in the candle-making composition will depend on the amounts of other additives which can typically be included in the composition.

Thus, preferably the composition contains a microcrystalline wax in the amount of preferably up to 1% by weight. The function of the microcrystalline wax is to give the candle a more smooth, glossy appearance, if required; that is to give the candle a better aesthetic appearance. Microcrystalline wax can also improve fragrance retention.

Additionally, or alternatively the composition may contain polyethylene in an amount of preferably up to 1% by weight. Polyethylene can give some benefit in terms of fragrance retention and aesthetic.

Additionally, or alternatively the composition may contain Vybar (Trade Mark) to help in reducing air bubbles, to inhibit mottling and to enhance fragrance and colour retention. Preferably up to 0.2% by weight is present.

The composition may comprise further components, preferably in an amount from 1 to 20% by weight, such as one or more compounds selected from fragrances, malodour counteractants, insecticides, pesticides, insect repellents, colorants, anti-oxidants, preservatives, anti-ingestion agents, stabilisers, insect repellents, deodorizers and masking agents.

The fragrance or other air-borne agent may preferably be present in the composition up to an amount of 10% by weight. Suitable fragrances are generally known in the art, for example one comprising fragrant material selected from one or more of the following cedarwood oil, sandalwood, bergamot, Bulgarian rose oil, patchouli, myrrh, vanilla, clove leaf oil, linalol, ethyl alcohol, tepineol, menthol, citronellal and phenyl ethyl alcohol. The fragrance normally comprises a carrier solvent such as diethylphthalate, carbitol, dipropyleneglycol, or dipropylglycol.

Suitable malodour counteractants are well known, for example is one or more aroma and/or non-aroma chemicals which are known to have an action in reducing the perception of the intensity of malodours for example unsaturated esters, ketones, aldehydes, and/or fragrant materials such as citronellal or cedarwood oil (which is known to counteract the perception of tobacco malodour). Preferably 0.1 to 10% by weight are present.

Suitable insecticides, pesticides and insect repellents are well known for use in the invention for example a pyrethroid, niotinoid, rotenoid, tetramethrin, bioallerthrin, allethrin, phenthrin, dinitrophenol, organothiocyamate, benzene hexachloride, citronellal, a polychlorinated cyclic hydrocarbon (for example heptachlor, aldrin or telodrin) or an organophosphorous compound for example tetraethyl pyrophosphate). Preferably 1 to 10% by weight is present.

Also, the present invention is particularly useful in the manufacture of coloured or tinted candles and to this end a dye, pigment or other colouring material which is soluble in wax may be included in the composition up to an amount of preferably 0.5% by weight. Suitable dyes and pigments are generally known in the art, for example pigment ivory, pigment cobrizo, Iragon Green, Iragon Violet, Sandoplast Blue 2B and Fat Red 5B02. The dyes can be either in the form of solid cakes or chips, a powder or a liquid.

A suitable anti-oxidant is, for example, tocopherol, ascorbyl palmitate, butylated toluene, ascorbic acid, tert-butyl hydroquinone, beta carotene, butylated hydroxy toluene or a gallate. Preferably 0.1 to 2% by weight of an antioxidant may be present in the composition.

Suitable preservatives are quaternary alkyl ammonium compounds or imidazolinium derivatives. Preferably 0.1 to 2% by weight of a preservative may be present in the composition.

The candle product can be in any suitable form known in the art. It may take the form of a taper candle, a votive candle, a tea light or a column candle or may be contained in a jar or other container. Such candles preferably contain a wick, but could also comprise a wickless taper. The wick, if present may be any conventional consumable wick material, such as cotton, cellulose, nylon, or paper. The wick may preferably be located in the centre of the candle, or may be off centre as desired. The presence of two or more wicks is also within the scope of the present invention. Non consumable wicks of an appropriate design, such as fibreglass, could conceivably be used, but in the past have been found to present problems of poor burn characteristics and excessively large flame when employed in conventional candles.

material. In the present invention the "core composition" preferably comprises Paraffin 5203 in an amount of at least 90% by weight of the "core composition", more preferably at least 99% by weight of the "core composition" and most preferably 99.9% by weight of the "core composition". The candle composition in a liquid state is then poured and set surrounding the wick coated with the core composition.

An example of a hard paraffin wax which is suitable for use in the present invention is one which is designated paraffin wax 5203 (Tradename) and whose characteristics are set out below.

An example of a soft paraffin wax which can be used in this invention is one which is designated paraffin wax 6214 (Tradename) and whose characteristics are also set out below. Another soft paraffin wax which may be used in the present invention is one which is designated paraffin wax 6213 (Tradename) and whose characteristics are set out in the Table below. In a preferred embodiment paraffin wax 6214 is used.

These waxes have various synonyms to describe them and these are also set out below under the CAS numbers which are appropriate to them.

TABLE

| Composition | Paraffin 5203 Solid saturated Hydrocarbons $C_nH_{2n+2}$ | Paraffin 6214 Solid saturated Hydrocarbons $C_nH_{2n+2}$ | Paraffin 6213 Solid saturated Hydrocarbons + Triglyceride < 25% |
|---|---|---|---|
| CAS No. | 64742-51-4, 8002-74-2 | 64742-51-4 | Paraffin: 64742-51-4, 8002-74-2 Triglyceride: 84540-04-5 |
| EINECS No. | 266-154-5, 232-315-6 | 265-154-5 | Paraffin: 265-154-5, 232-315-6 Triglyceride: 283-093-2 |
| Physical Description | At 20° C., waxy solid | At 20° C., waxy solid | At 20° C., waxy solid |
| Colour | White | Whitish | White/Whitish |
| Odour | Practically odourless | Practically odourless | From neutral to slightly fatty like |
| Congealing point | 52–54° C. | 48–52° C. | 42–46° C. |
| Penetration test at 25EC (dmm) | 16–20 | 50–70 | 70–100 |
| Flash point | >150° C. | >150° C. | >150° C. |
| Viscosity (100EC) | 2.5–10 mm2/s | 4.0–6.0 mm2/s | 4.0–5.0 mm2/s |

CAS No. 64742-51-4/Synonyms . . . Paraffin waxes, petroleum, hydrotreated
CAS No. 8002-74-2/Synonyms . . . Paraffin Wax; Paraffin waxes: Paraffin wax (petroleum); Poly(methylene)wax; Wax extract; Paraffin wax fume; Fischer-tropsch wax; Cream E45; Derma-Oil; Duratears; Granugen; Parachoc; Replens; Paraffin Wax, granular;

In a preferred embodiment the candle comprises a container in which the candle composition in a liquid state has been poured and set surrounding a candle wick.

The preparation of the paraffin wax blended composition is quite conventional and the skilled person needs no specific guidance in this respect and the same applies to the manufacturing procedures which can be used for making candles from candle wax compositions. A candle is formed by first coating the wick to be used in the candle with a "core composition". The "core composition" can comprise any suitable paraffin wax. In a preferred embodiment the "core composition" may contain a pigment, dye or other colouring It should be noted that all three paraffins appear to be fairly similar but differ significantly in some of their physical properties, in particular the penetration values and also their congealing points, the latter it will be seen being appropriate to provide a melting point of the overall composition around 50° C. as explained hereinbefore.

As a specific example of a candle composition in accord with the present invention the proportion of ingredients are set out below.

| Candle Composition | |
|---|---|
| | % by weight per mix |
| Core Composition | |
| Paraffin 5203 | 99.898 |
| Pigment Ivory 15-1641 | 0.1 |
| Pigment Cobrizo 29-627 | 0.002 |
| Wax Composition | |
| Paraffin 6214 | 65.64 |
| Paraffin 5203 | 28.20 |
| Fir Vanilla Light 175297E | 5.41 |
| Microcrystalline Wax 1800 | 0.65 |
| Pigment Ivory 15-1641 | 0.09 |
| Pigment Cobrizo 29-627 | 0.01 |

The proportion by weight of the Core composition to the wax composition is approximately 26:74.

The invention will be illustrated by the following Example:

Method of Manufacture of the Candle

1) Core Production and Wicking

The appropriate amount of paraffin 5203 is weighed into a mixing tank. The appropriate amounts of the pigment ivory and pigment cobrizo dyes are then added to the same tank. The tank temperature is maintained at 60 to 65° C. whilst the contents of the tank are stirred until the dye has melted and completely dispersed.

The resulting coloured liquid wax is then fed to a spraying drum feed tank. The powder is sprayed and pumped via pipes to a powder press.

The appropriate wick is loaded into a wicking machine adjacent to the powder press. The specified length of wick is automatically inserted on line through the core and a metal sustainer is secured to the end.

2) Wax Blend

The appropriate amounts of Paraffin 5203, Paraffin 6214 and microcrystalline wax are transferred to a mixing vessel. The vessel temperature is maintained at approximately 65° C. whilst the mixture is stirred until all components have been fully melted and dispersed.

The appropriate amounts of Pigment Ivory, Pigment Cobrizo and Fir Vanilla Light are then added to the mixing vessel. The vessel temperature is maintained at a temperature of from 60 to 65° C. until the dye has completely melted and has been dispersed in the mixture.

3) Filling Line

The wick assembly/coloured core is transferred into a glass jar. The glass jar is heated to 55 to 60° C. by passing the glass jar through a glass heater.

The glasses are then filled with the wax blend via calibrated filling heads.

The filled glasses are then passed through a cooling tunnel and then an infra red "Flash" heater, which removes air bubbles and smoothes the wax surface.

The glasses are then passed through a second cooling unit.

The invention claimed is:

1. A paraffin wax candle composition comprising a mixture of a hard paraffin wax and a soft paraffin wax the hard wax having a penetration value as measured by the Needle Penetration Test as defined in ASTM D 1321 of 16–20 and the soft wax having a penetration value of no less than 45, the composition itself having a penetration value between 30 and 50.

2. A composition according to claim 1 wherein the soft wax has a penetration value of 50–70.

3. A composition according to claim 1 wherein the proportion by weight of the soft wax to the hard wax is in the range of 50:50 to 90:10.

4. A composition according to claim 3 wherein the proportion by weight of the soft wax to the hard wax is about 70:30.

5. A composition according to claim 1 wherein the melting point of the composition is in the range from 45° C. to 55° C.

6. A composition according to claim 5 wherein the melting point of the composition is about 50° C.

7. A composition according to claim 1 which contains a microcrystalline wax in an amount of up to 1% by weight.

8. A composition according to claim 1 which contains polyethylene in an amount up to 1% by weight.

9. A composition according to claim 1 which contains a colouring material in an amount up to 0.5% by weight.

10. A composition according to claim 1 which contains fragrance and/or other air-borne agent or agents in an amount up to 10% by weight.

11. A candle comprising a composition according to claim 1.

12. A candle according to claim 11 comprising a container in which a candle composition in a liquid state has been poured and set surrounding a candle wick.

* * * * *

UNITED STATES PATENT AND TRADEMARK OFFICE
CERTIFICATE OF CORRECTION

| | | |
|---|---|---|
| PATENT NO. | : 7,018,432 B2 | Page 1 of 1 |
| APPLICATION NO. | : 10/518969 | |
| DATED | : March 28, 2006 | |
| INVENTOR(S) | : Farid Moussouni | |

It is certified that error appears in the above-identified patent and that said Letters Patent is hereby corrected as shown below:

In the title page, field (30)
Under the heading "Foreign Application Priority Data":
June. 28, 2003 should read:
Jun. 28, 2002

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,018,432 B2 | Page 1 of 1 |
| APPLICATION NO. | : 10/518969 | |
| DATED | : March 28, 2006 | |
| INVENTOR(S) | : Farid Moussouni | |

It is certified that error appears in the above-identified patent and that said Letters Patent is hereby corrected as shown below:

On the title page (30)
Under the heading "Foreign Application Priority Data":
Jun. 28, 2003 should read:
Jun. 28, 2002

Signed and Sealed this

Twenty-second Day of August, 2006

JON W. DUDAS
*Director of the United States Patent and Trademark Office*